May 2, 1939.   L. N. BROWN   2,157,052
RECORD CARD
Filed June 24, 1937
Fig.1.
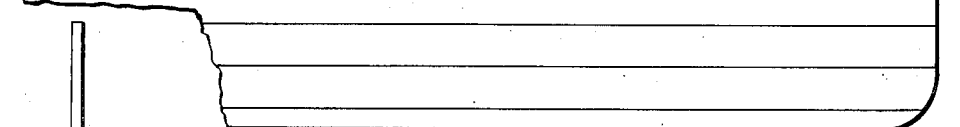
| NO. | ITEM | DATE | CHARGE | CREDIT | BALANCE | ACCT. NO. TRANS. |
|---|---|---|---|---|---|---|
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | | | | | | |
| 21 | | | | | | |
| 22 | | | | | | |
| 23 | | | | | | |
| 24 | | | | | | |
| 25 | | | | | | |
| 26 | | | | | | |
| REMARKS | | | | | | |
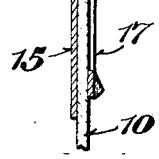
Fig.2.
Inventor
Louis N. Brown,
By *Emery Booth Holender & Miller*
His Attorneys Patented May 2, 1939

2,157,052

UNITED STATES PATENT OFFICE 2,157,052

RECORD CARD

Louis N. Brown, Memphis, Tenn.

Application June 24, 1937, Serial No. 150,188

1 Claim. (Cl. 129—16.7)

The present invention relates to ledger posting account or record cards and the like, such as are used in posting and accounting machines, and the invention aims generally to improve the construction and facilitate the use of such cards.

Ledger posting or record cards for use with modern accounting machines are printed forms serially numbered and are usually consecutively filed according to their serial numbers.

In many instances customers opening charge or partial payment accounts desire to make payments on the accounts on a specific date, and accordingly it is desirable to readily select, from the consecutively filed account cards, those on which payments are to be made on a certain date.

According to the invention, the cards are provided with signal clips adapted to be exposed in the file so as to be readily selected by the operator on the due date, the construction permitting the cards with signal clips attached to be inserted in the posting machine.

The invention will be better understood by reference to the accompanying drawing illustrating one manner of using the invention.

In the drawing—

Fig. 1 is a plan view of a card constructed in accordance with my invention; and Fig. 2 is a detail sectional view taken on the line 2—2 of Fig. 1.

Ledger posting cards for use with modern posting and accounting machines comprise usually a rectangular printed form card 10, printed with a heading 11, for the reception of the name and address of the customer as well as a serial number 12, according to which the cards may be filed. Such cards are usually lined as at 13, for the entry of data relating to transactions of purchase and payments. Such data is conveniently printed by the printing mechanism of the ledger posting or accounting machine.

In order to readily select from the consecutively filed cards those as to which payments are to be made on a predetermined date, the cards are printed with desired classification data 14, as for example to indicate the days or dates on which payments are to be made, and a signal clip 15 is adjustably clamped to the edge of the card containing such classification data. Preferably this classification data 14 is divided into spaces corresponding in width to the width of the clip 15, and the clip 15 may have its indicating tab 16 cut from the body thereof, presenting a frame 17 surrounding the classifying data as illustrated in Fig. 1.

Conveniently, the clips used to identify the cards for a certain classification may be uniformly of one color, and those used to identify other cards according to other different classifications may be of distinctive colors. For example, cards to be selected on Monday, Tuesday, Wednesday, Thursday, Friday and Saturday, may be marked respectively with white, red, blue, green, yellow and black colored clips, so that an operator may readily select in advance all cards according to a certain classification.

When a card has been selected for the entry of certain transactions, as for example when payment is made, it is desirable that such card be inserted in the machine without requiring the removal of the indicating clips 15. In modern posting and accounting mechaines, such for example as the National Cash Register accounting machine, the cards are inserted in a horizontal position between guides of the machine, the upper edges of the card being on the left hand side.

In order to permit the insertion of the cards in the machine, while the signal clips are attached thereto, I cut out the upper edge of the card, as at 18, over the classification data 14, so that the clips are wholly confined within the marginal edges of the card. With such construction the cards may be readily inserted in the machine without the removal of the signal clips 15.

When a plurality of such cards are filed in a filing tray, the recesses 18 will be in alignment, presenting to the view of the operator a series of colored indicating tabs. Hence all of the cards according to any certain classification may be readily selected at will, notwithstanding that the cards are filed consecutively according to their serial numbers.

It will be understood that the invention is not restricted in its use to account cards but is applicable also to various classifying systems, wherein cards bearing classification signal clips are to be used in posting or other machines of the type described.

Having described a preferred embodiment of the invention I claim as new:

A record card for use in posting machines comprising a substantially rectangular printed form, one side only of the upper edge of said card being formed with an elongated recess of a length of less than half the width of the card, the opposite sides of said recess providing spaces of different width for identification indicia and the bottom edge of the recess being provided with other indicia, and a signal clip of identifying color slidably engaging the bottom edge of said recess and slidable over the indicia thereon, said clip having an indicating tab confined wholly within the marginal edges of the card whereby said card may be inserted endwise between guides of a posting machine without removal of the signal clip.

LOUIS N. BROWN.